(No Model.)

G. C. BOURNS.
SPECTACLES.

No. 513,078. Patented Jan. 23, 1894.

Witnesses.
N. R. Barton
Simon E. King

Inventor.
George C. Bourns
By Chas. H. Burleigh
Attorney

UNITED STATES PATENT OFFICE.

GEORGE C. BOURNS, OF WORCESTER, MASSACHUSETTS.

SPECTACLES.

SPECIFICATION forming part of Letters Patent No. 513,078, dated January 23, 1894.

Application filed April 24, 1893. Serial No. 471,531. (No model.)

*To all whom it may concern:*

Be it known that I, GEORGE C. BOURNS, a citizen of the United States, residing at Worcester, in the county of Worcester and State of Massachusetts, have invented a new and useful Improvement in Spectacles, of which the following, together with the accompanying drawings, is a specification sufficiently full, clear, and exact to enable persons skilled in the art to which this invention appertains to make and use the same.

The object of my invention is to provide, in combination with spectacles, convenient means for observing objects behind or at one side of the plane of the spectacles without requiring the observer to turn his or her head therefor; and my invention consists in a pair of spectacles having a small mirror, or mirrors, connected therewith, as hereinafter more fully explained.

Figure 1:
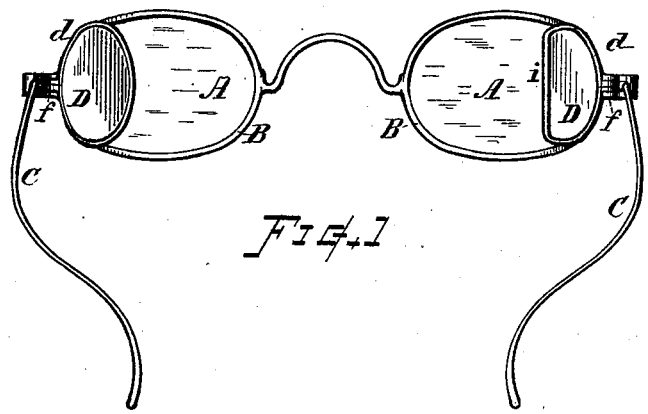
Figure 2:
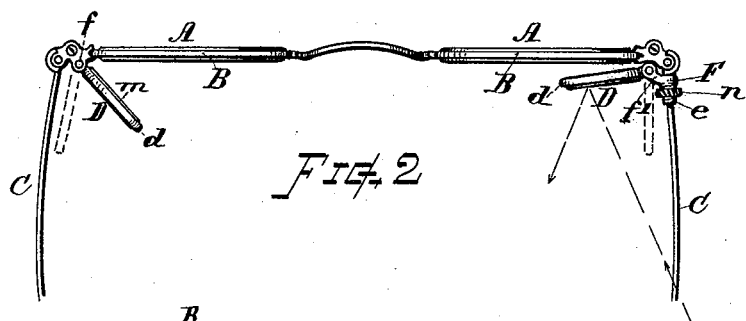
Figure 3:
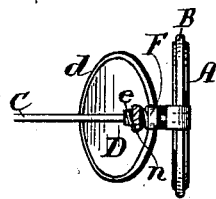

In the drawings, Figure 1 is a back view of a pair of spectacles illustrating my invention. Fig. 2 is a plan view of the same. Fig. 3 is a side view, and Fig. 4 shows the mirror and a detachable connection therefor separate from other parts.

Referring to parts, A denotes the spectacle glass, B the eye-frame, and C the bows; all of which may be of the well known construction. In rear of the outer end of the spectacle glass I arrange a small backwardly faced mirror D supported in a rim or frame $d$ which is supported upon the spectacle at the angle between the frame and bow by a hinging joint at $f$ that permits swinging adjustment of the mirror, so that said mirror can be placed at any convenient angle for reflecting the visual rays from any object at the side or rear of the spectator onto the retina of the eye, and at the same time leaving the line of sight through the spectacle glass practically unobstructed; thereby affording facility for the spectator to view objects or persons both in front and in rear of the plane of the spectacle glasses without turning about.

The connecting joint by which the mirror is attached to the bow or frame can be a hinge pivoted directly to the frame, as indicated at the left side of Fig. 2; but is preferably made as shown at the right on Fig. 2, and in Fig. 3, with a detachable joint-piece F having means for clamping it to the bow C of any ordinary spectacles. This joint-piece is best formed as a split socket having a hinging ear $f'$ and a conical threaded portion $e$ that embraces the bow C upon which it is firmly compressed by an internally tapered nut $n$ screwed onto the tapered portion $e$ as illustrated.

Figure 4:
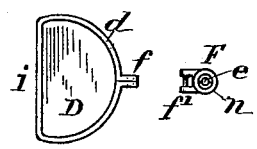

The mirror D and its frame $d$ may be of circular or other shape; a very desirable shape is shown at the right in Fig. 1, and Fig. 4, in which the inner edge is formed vertically straight, as at $i$, or the parts given a somewhat crescent shape so that the mirror will cover but little of the spectacle glass when swung forward adjacent to it. The face of the mirror can be made either straight, slightly concaved, or slightly convexed as desired. The reverse surface of the mirror plate is best covered with an opaque protecting coating or surface plate $m$ of any suitable material. When not in use the mirror can be swung outward against the bow, as indicated by dotted lines on Fig. 2.

I am aware that supplemental lenses have heretofore been hinged to the frames of spectacles, and also that eye-glasses have been combined therewith for the use of engravers, watchmakers and others; hence I do not claim such appliances as of my invention.

I claim—

1. The combination with the spectacle glasses and the bows for supporting the same when in use, of the backwardly reflecting mirror attached thereto by a detachable connector, and disposed in the angle between the bow and eye-glass, and hinged to swing inwardly forward to any degree of inclination, or outward against the bow, substantially as shown and described.

2. In combination with a pair of spectacles provided with eye-frames and bows, the backwardly reflecting mirror connected with the bow by a hinge-joint-piece having a clamping attachment thereon, whereby said hinge-joint-piece is detachably connected with the bow of the spectacles, and adjustable to different inclinations, substantially as and for the purpose set forth.

3. In combination with spectacles, the backwardly reflecting mirror provided with a detachable connecting joint-piece consisting of a split socket, having a hinging-ear, to which the mirror frame is pivoted, and a conical threaded portion that embraces the spectacle bow, and an internally tapered nut on said threaded portion by which said socket is clamped onto said bow, substantially as set forth.

Witness my hand this 20th day of April, A. D. 1893.

GEORGE C. BOURNS.

Witnesses:
CHAS. H. BURLEIGH,
ELLA P. BLENUS.